United States Patent

Belle

[15] 3,695,111
[45] Oct. 3, 1972

[54] APPARATUS FOR AND METHOD OF CONTINUOUSLY MEASURING A TEMPERATURE GRADIENT IN RELATION TO ALTITUDE

[72] Inventor: Pierre Belle, 5 rue Lecardonnel, Grenoble, Isere, France

[22] Filed: July 6, 1970

[21] Appl. No.: 52,561

[52] U.S. Cl. .................................73/345, 73/170 R
[51] Int. Cl. .........................G01k 13/00, G01w 1/04
[58] Field of Search .................73/345, 170 A, 170 R

[56] References Cited

UNITED STATES PATENTS

| 2,592,744 | 4/1952 | Ryant | 73/345 |
| 3,229,517 | 1/1966 | Smith | 73/170 |
| 2,441,133 | 5/1948 | Brady | 73/170 |

FOREIGN PATENTS OR APPLICATIONS

| 410,705 | 10/1926 | Germany | 73/345 |

OTHER PUBLICATIONS

Captive Balloon Refractovariometer; by Crozier, in Review of Scientific Instruments; April 1958; Volume 29 Member 4; pages 276, 277, 278, 279.

Primary Examiner—Louis R. Prince
Assistant Examiner—Denis E. Corr
Attorney—Sylvester J. Liddy, John J. Hart, Joe E. Daniels and Charles E. Baxley

[57] ABSTRACT

The continuous measurement of a temperature gradient in relation to altitude is made directly by providing in the apparatus units sensitive to temperature and altitude and arranged to control a registering scribe and a recording drum as the apparatus is moved through an extended altitude (height or depth) at a given speed.

2 Claims, 4 Drawing Figures

INVENTOR.
PIERRE BELLE

INVENTOR.
PIERRE BELLE
BY
ATTORNEY

APPARATUS FOR AND METHOD OF CONTINUOUSLY MEASURING A TEMPERATURE GRADIENT IN RELATION TO ALTITUDE

THE INVENTION

This invention relates to the continuous measurement of a temperature gradient in relation to altitude and has for its primary purpose the provision of an apparatus which may be displaced in altitude and can be employed to directly obtain a temperature curve related to altitude.

In accordance with the invention there is provided a rotatable recording drum and an associated registering scribe; the rotational movement of the drum and the movements of the scribe being controlled by apparatus sensitive to temperature and altitude. The graph thus obtained will give directly and continuously the evolution of temperature in relation to altitude either as a function of atmospheric height or of water depth. The movement of the registering scribe may be controlled by a unit sensistive to height, while the rotation of the drum is controlled by a unit sensitive to temperature, such as as electric motor fed by an electric current modulated proportionally to the variation of temperature in such latter unit. On the other hand, the movement of the registering scribe may be controlled by a unit sensitive to temperature and the rotation of the drum controlled by a unit sensitive to altitude and constituted of an electric motor fed by an electric current modulated proportionally to the variation in altitude of this latter unit. In measuring a temperature gradient in relation to atmospheric height, the aforesaid apparatus is suspended from a captive balloon which is given a suitable lifting speed compatible with the reaction time of the temperature detection unit. When the curve of variation of water temperature in relation to depth is to be registered, the aforesaid apparatus is enclosed in a sealed box which is lowered in a continuous manner into the water.

The characteristics and advantages of the invention, it is believed, will be better understood from a perusal of the following description, when read in connection with the accompanying drawings, in which FIG. 1 is an elevational view showing apparatus embodying the invention suspended from a captive balloon;

Figure 1:
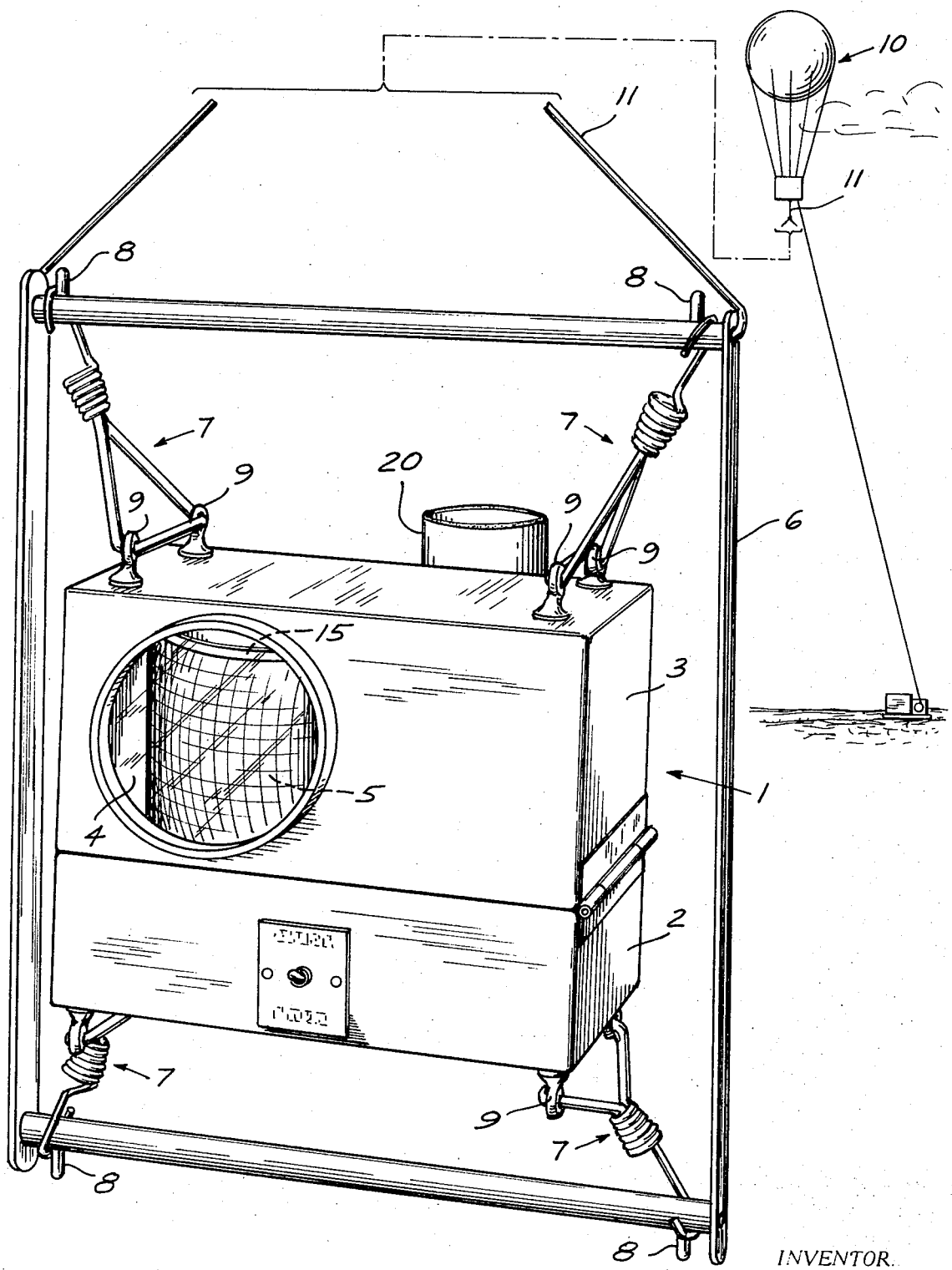
Figure 2:
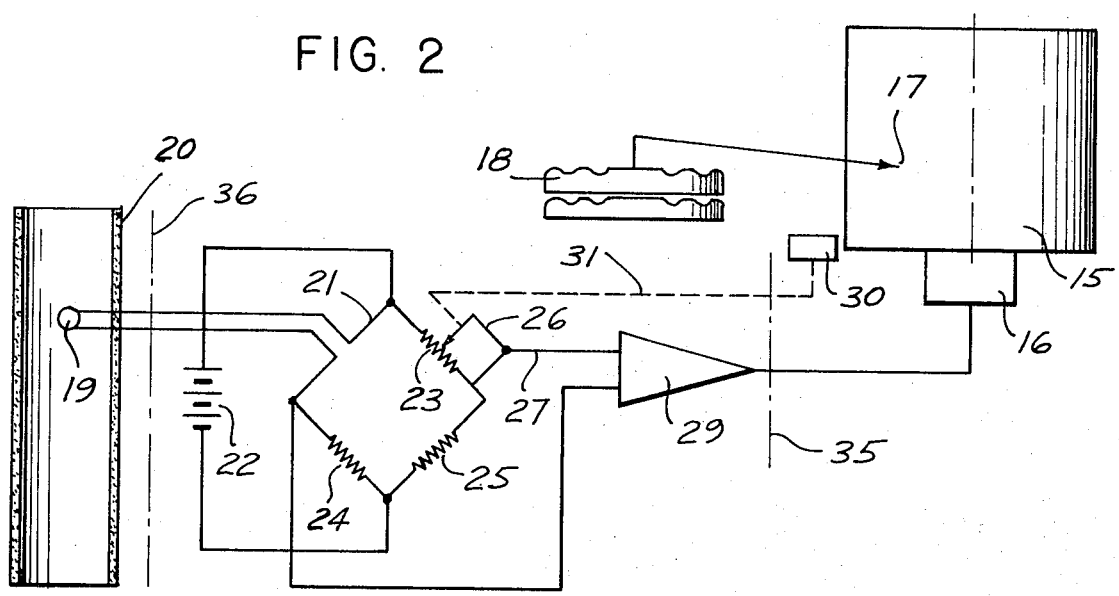
FIG. 2 is a schematic drawing of the temperature recording mechanism embodied in the unit shown in FIG. 1 and in which the recorder is controlled by a unit sensitive to height and the cylinder motor is controlled by variation of temperature.

In FIGS. 1 and 2 of the drawings, the reference numeral 1 indicates generally a container for the apparatus composed of a base 2 having a hinged cover 3 provided with a window 4 through which may be observed a chart 5 on which the recording is made. The container 1 is suspended within a frame 5 by suitable flexible shock absorbing supports 7, each of which is secured at one end in proper position on the frame by a frame projection 8, and connected at its other end to support elements 9 provided on the base and cover of the container 1. The frame 6 is suspended from a captive balloon 10 by means of a cable 11. As previously indicated, the captive balloon 10 is provided with a suitable lifting speed compatible with the reaction time of the particular temperature detection unit employed in the apparatus.

As is better shown in FIG. 2, the record chart 5 is mounted on a known type of recording drum 15, the rotation of which is controlled by an electric motor 16. Associated with the drum 15 is a recorder 17 which is connected in a known manner to an altimeter 18 of a type available to the art. The current fed to the electric motor 16 is controlled by means of a resistance temperature probe of a known type connected to one of the branches of a Wheatstone bridge. As is shown in FIG. 2, the resistance temperature probe 19 is located in the interior of a vertically positioned thermally isolated cylinder 20 which shields it from the sun's rays and which is open at both ends to permit of the free circulation of air therethrough. As is indicated in FIG. 1 the cylinder 20 is located exteriorly of the casing 1 and is fixed to the base 2 of such casing so that the cover 3 thereof may be opened and closed without disturbing such cylinder. As a result of this arrangement the probe 19 will effectively register variations of the ambient temperature of the air. The temperature probe 19 is connected to a branch 21 of a Wheatstone bridge fed by a direct current supply 22. The other three branches of the Wheatstone bridge are normally formed of a variable resistance 23 and fixed resistances 24 and 25. The initial balance of the bridge for a given temperature of the probe 19 is effected by displacing the cursor 26 of the variable resistance 23.

A variation in temperature of the probe 19 will result in a variation of the electrical resistance and disbalance of the bridge which will as a result produce an electric current proportional to this variation in temperature in conductors 27 and 28. This current is amplified through a differential amplifier 29 which feeds the amplified current to the electric motor 16 to cause it to make an angular displacement of the drum 15 corresponding to the difference in the then temperature of the probe 19 from the initial temperature thereof. The drum 15 is connected to the variable resistance 23 of the Wheatstone bridge by a mechanical connection 30,31 between such drum and the cursor 16. Thus, when the drum 15 is angularly displaced by the motor 16 due to a variation in temperature of the probe 19, the mechanical connection 30,31 will operate the cursor 26 to adjust the variable resistance 23 so as to rebalance the bridge in relation to the new position of the recording drum. The mechanical connection 30,31 therefore acts as a slave for the position of the drum compared with the temperature of the probe.

With the foregoing in mind, let it be assumed that the unit is attached to a captive balloon whose rising speed is controlled at one meter per second. The reaction time selected for the probe 19 is sufficiently low to ensure that registration of temperature evolution as a function of height may be made during the rise of the balloon at the aforesaid speed. Under such conditions, there will be obtained on the chart 4 mounted on the recording drum 15, a graph line showing in the direct evolution of the temperature in relation to altitude. The choice of resistance 23 in the Wheatstone bridge will define the range of temperature which may be so measured. The response speed of the unit depends upon the reduction ratio that is chosen for the drive of the drum motor 16 and the time constant of the probe 19.

Figure 3:
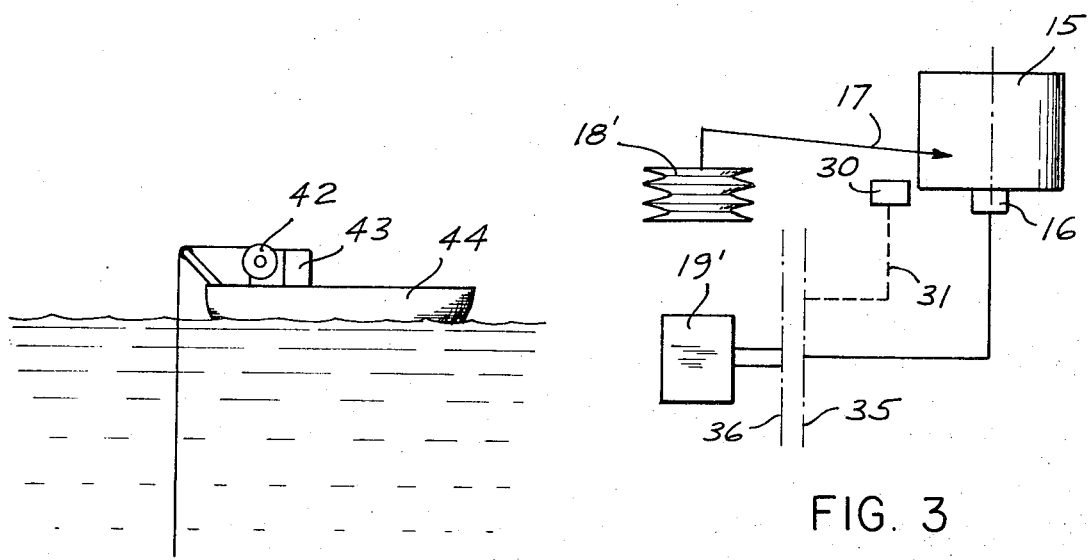
FIG. 3 is a drawing similar to FIG. 2 but showing the manner in which the recorder may be controlled by temperature and the cylinder motor may be controlled by variations in altitude.
Figure 4:
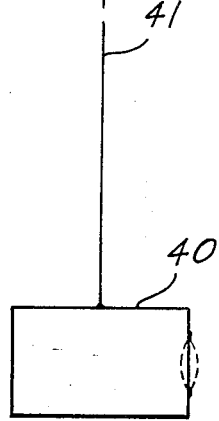
FIG. 4 is a perspective view of apparatus embodying the invention employed and registering variations of water temperature in relation to depth.

As previously stated, it is contemplated to reverse the controls of the recorder and the drum motor so that the former is controlled by temperature and the latter by altitude. Thus, as is indicated in FIG. 3 of the drawings, the altimeter 18 of FIG. 1 may be replaced by any known arrangement in which changes in temperature are transformed into mechanical movement, such as a mechanical deformation detector of the thermal switch type, or a heat bellows such as the bellows 18' shown in such FIG. 3. The movement of rotation of the drum 15 may be controlled by substituting an electric altimeter 19' of known construction for the temperature probe 19 in FIG. 1. As indicated, the parts between the electric altimeter 19' and the motor 16, the operations of which are controlled by the electric current modulations corresponding to variations in altitude, are similar to that shown between the dotted lines 35,36 in FIG. 1 of the drawings.

As is also previously stated, it is contemplated to use the apparatus of this invention to register temperature curves of water as a relation to its depth. Thus, instead of utilizing a container such as the container 1 shown in FIG. 1, the apparatus is enclosed in a sealed box which may be suspended from a boat 44 by a cable 41 that may be wound on a drum 42 whose rotational movements are controlled by an electric motor 43. The connection between the drum 42 and the motor 43 is made in a known manner to enable the motor to unwind the drum so that the speed of descent of the sealed box 40 is at a given rate such as to enable the registration of the temperature of the water as a function of depth. In this practice of the invention, the cylinder 20 in FIG. 1 may be eliminated and the probe 19 may be connected to, or embedded in the wall of the sealed container 40 in any suitable manner. Due to the differences of the medium in which such record is being made, the characteristics of the probe and the altimeter should also be modified in a known manner to take care of such differences.

It will be understood that where in the accompanying claims, the terms "altitude" and "height" are used, such terms shall also encompass "depth" where proper.

I claim:

1. Apparatus for continuously and directly measuring temperatures through an extended altitude, comprising a unitary carrier supporting a recording drum unit, a registering scribe unit associated with said drum, means sensitive to temperature connected to and controlling the operation of one of said units, means sensitive to altitude connected to and controlling the operation of the other said units, means for moving said unitary carrier through an extended altitude at a given speed compatible with the response speed of said units, said moving means comprising a captive balloon having a constant given rising speed compatible with the response time of said temperature sensitive means, and means for suspending said unitary carrier from said captive balloon, said unitary carrier constituting a container, and said temperature sensitive means comprising a temperature probe located exteriorly of said container, and a thermally isolating member enclosing said probe and shielding it from the sun's rays without affecting its measurements of the ambient temperature of the air.

2. Apparatus for continuously and directly measuring temperatures in a fluid through an extended altitude thereof, comprising a unitary carrier, means supporting said carrier in suspended relation and operable to move said carrier through an extended altitude of the fluid at a given speed, said carrier supporting a recording drum unit, a registering unit cooperable with said drum, means sensitive to temperature changes in the fluid throughout the extended altitude thereof through which the carrier is moving, means sensitive to changes in altitude of the carrier as it is moving through said extended altitude of fluid, first means operatively connecting said temperature sensitive means to one of said units so that the latter is controlled thereby, and second means operatively connecting said altitude sensitive means to the other of said units so that the latter is controlled thereby, one of said first and second connecting means comprising a continuous balance Wheatstone bridge arrangement including a motor connected to said drum unit and causing rotative movements of the drum thereof to positions corresponding to the changes in the sensitive means connected thereto during the movement of the carrier through such extended fluid altitude, and third means mechanically linking said drum to said Wheatstone bridge and operative by said drum on each movement thereof to readjust said bridge to the new position of the drum, said unitary carrier comprising container means wholly enclosing said drum unit, said registering unit, said altitude sensitive means, and said first, second and third means, and said temperature sensitive means being associated with said container means as to be responsive to variations in the temperature of said fluid.

* * * * *